3,113,945
PREPARATION OF 4-AMINOPYRIMIDINES
Lewis Smith Meriwether, Norwalk, Conn., assignor to American Cyanamid Company, New York, N.Y., a corporation of Maine
No Drawing. Filed Apr. 13, 1961, Ser. No. 102,634
12 Claims. (Cl. 260—256.4)

The present invention relates to a novel process for the preparation of 4-aminopyrimidines. More particularly, it is related to the preparation of 4-aminopyrimidines by the trimerization of a certain class of alkyl-substituted nitriles in the presence of an iron carbonyl catalyst.

Heretofore, 4-aminopyrimidines have been prepared by several methods. Unfortunately, none is entirely satisfactory commercially. One such method involves the trimerization of acetonitrile utilizing an alkali metal alcoholate, such as sodium methoxide. Unfortunately, this process results in the substantial destruction of the alcoholate when water is employed in the recovery of the desired 4-aminopyrimidine. Since the alcoholate cannot be conveniently reused, the cost for operating this process becomes economically unfeasible. Another method employed for pyrimidine preparation has been to employ a metal hydride as the catalyst in the trimerization of a nitrile. Unless special precautions are taken, however, the catalyst is quickly hydrolyzed or rendered substantially ineffective due to the presence of water ordinarily found in commercial nitrile. Yields of resultant pyrimidines are markedly reduced in the absence of a pretreatment step. It has been suggested that water be removed from the nitrile prior to trimerization by utilizing distillation techniques in the presence of phosphorous pentoxide. Accordingly, this process is rendered commercially unattractive necessitated by a pretreatment step for water removal from commercial nitriles.

4-aminopyrimidines have achieved a distinct status as products of commerce. To provide an economical, straightforward method for their preparation that would avoid the aforementioned drawbacks, would be highly desirable.

It is, therefore, a principal object of the present invention to provide 4-aminopyrimidines utilizing a novel method for trimerizing a nitrile. It is a further object of the present invention to provide a process for trimerizing a nitrile in the absence of any nitrile pretreatment and in the presence of an iron carbonyl catalyst. Other objects will become apparent from a consideration of the following detailed description.

To this end, it has been unexpectedly found that certain alkylnitriles can be readily polymerized by causing the latter alkyl-substituted nitriles to polymerize in the presence of an iron carbonyl catalyst whereby 4-aminopyrimidines can be recovered in good yield and purity. Surprisingly the nitrile reactants need not be pretreated prior to polymerization, thus permitting the use of commercially available nitriles.

According to the process of the present invention, it has been found that small quantities of an iron carbonyl, either in the absence or in the presence of an acetylene diluent can be introduced into a nitrile and resultant mixture heated to an elevated temperature. If desired, the reaction may be carried out in the presence of an inert solvent.

In general, any aliphatic or aromatic nitrile having the formula

where R is organic radical, such as alkyl, aryl and aralkyl substituents, such as for instance lower alkyl or nitro which are positioned on the aryl or aralkyl and are substantially inert to polymerization, are also contemplated. It is within the purview of the invention to utilize varying mixtures of the nitriles, as well as the nitrile per se.

Illustrative nitriles suitable for polymerization may be mentioned:

Acetonitrile
Propionitrile
Butyronitrile
Valeronitrile
Capronitrile
Caprylonitrile Phenylacetonitrile
Phenylpropionitrile
p-Methylphenylacetonitrile
p-Nitrophenylbutyronitrile
o-Nitrophenylacetonitrile
m-Nitrophenylbutyronitrile Contemplated polymerization catalysts admixed with nitriles in the process of the invention are the iron carbonyls, exemplary of which are iron pentacarbonyl [$Fe(CO)_5$], diferrocarbonyl [$Fe_2(CO)_9$] and iron tetracarbonyl [$Fe_3(CO)_{12}$]. These catalysts may be used alone or in conjunction with diluent acetylenes, such as acetylene, pentyne-1, butyne-1, hexyne-3 and 1,2-diphenylacetylene. Of the aforementioned, 3-hexyne is preferred due to its ease in handling, safety and availability. It has been found that, if desired, the iron carbonyl catalyst and the acetylene additive can be present during polymerization in varying amounts usually from 0–10 mols of the acetylene additive per mol of catalyst. For optimum results, approximately equimolar proportions of the iron carbonyl and the acetylene additive are employed in the practice of the invention.

Catalyst for the novel polymerization reaction is employed in an amount equal to from 0.1% to 10%, or even higher, based on the weight of the nitrile to be trimerized. The preferred quantities of catalyst used for best operating practices are found to be in the range of from about 1% to 5%, based on the weight of the nitrile.

The reaction is carried out at temperatures below the decomposition point of the nitrile, generally between about 150° C. and 300° C. in any suitable closed reaction vessel under autogenous pressures or higher. It has been found that carrying the process of the invention out at temperatures between about 200° C. and 250° C. and at illustrative pressures between about 5 and 500 p.s.i.g. are preferred to recover optimum yields of desired 4-aminopyrimidines.

Depending on the reaction conditions of temperature and pressure, a reaction time range of about one hour to about fifty hours can be employed to carry out the process of the invention. Selecting more stringent reaction conditions, that is elevated temperatures, say in the range of 325° C. to 350° C., and pressures in the range of 450 to 500 p.s.i.g., at a time of only several hours is required for completion of the reaction. Since economy of operation is sought, less stringent operating conditions, namely, autogenous pressures and temperatures in the range of 200° C. to 250° C. with concomitant longer reaction times, say about twenty-four hours, are preferred.

When the trimerization process is terminated, 4-aminopyrimidines are recovered at room temperature and purified as by recrystallization or by distillation. White crystals of a 4-aminopyrimidine are obtained in good yield.

If desired, suitable inert solvents may be admixed with the nitrile prior to trimerization. Such solvents are, for instance, petroleum ether, benzene, dioxane, tetrahydrofuran and cyclohexane. These are recovered by distillation in the course of purifying resultant 4-aminopyrimidine.

In order to facilitate a further understanding of the invention, the following examples are given primarily for the purpose of illustrating certain more specific details thereof. The scope of the invention is not deemed limited thereby except as defined in the claims. Unless otherwise stated, the parts are by weight.

Example 1

A solution containing 7.5 parts (0.038 mol) of iron pentacarbonyl and 3.6 parts (0.044 mol) of hexyne-3 in 78 parts (1.90 mols) of acetonitrile is sealed in a 300 cc. stainless steel autoclave, purged with nitrogen and heated with rocking at 250° C. for twenty-four hours. The autoclave is cooled and the contents are filtered yielding 20 parts of brown crystals of crude pyrimidine and 34.3 parts of dark brown liquid filtrate. Evaporation of the unreacted nitrile from the filtrate yields an additional 5.5 parts of crude pyrimidine. Resultant yield of crude pyrimidine obtained is 25.5 parts or 33%. The product is purified by recrystallization from benzene. Upon analysis, the compound identified by infrared spectrum as 4-amino-2,6-dimethylpyrimidine, has a melting point of 183° C. to 184° C.

Example 2

Example 1 above is repeated in every detail except that 5.2 parts of pentyne-1 (0.077 mol) are substituted for the hexyne-3.

A 31% yield of 4-amino-2,6-dimethylpyrimidine is obtained.

Example 3

Replacing the mixture of hexyne-3 and iron pentacarbonyl in Example 1 with 2 parts of tetraethylcyclopentadiene-iron-tricarbonyl and repeating that example in every detail, a 21% over-all yield of 4-amino-2,6-dimethylpyrimidine is obtained.

Example 4

A solution of 0.5 part of diferrocarbonyl [$Fe_2(CO)_9$] in 78 parts of acetonitrile is sealed in a tube under nitrogen gas and heated under autogenous pressure in a muffle furnace at 245° C. for 16 hours. The contents of the tube are cooled and filtered and unreacted acetonitrile is removed by distillation. Infrared spectrum examination of the residue indicates the presence of 4-amino-2,6-dimethylpyrimidine, which is obtained in about 20% yield.

Example 5

Example 4 is repeated employing 1 part of iron tetracarbonyl instead of diferrocarbonyl. A 21% yield of 4-amino-2,6-dimethylpyrimidine is isolated from the reaction mixture.

Example 6

A solution containing 7.5 parts (0.038 mol) of iron pentacarbonyl and 3.6 parts (0.044 mol) of pentyne-1 in 78 parts (1.42 mols) of propionitrile and 50 parts of benzene is sealed in a stainless steel autoclave, purged with nitrogen and heated with rocking under a pressure of about 50 p.s.i.g. at 200° C. for twenty-four hours. Upon cooling the autoclave to room temperature, 62 parts of a dark liquid are obtained. Upon evaporation on a rotary evaporator to remove unreacted nitrile, resultant residue contains about 16 parts or 20% of crude 4-amino-5-methyl-2,6-diethylpyrimidine. On recrystallization, a purified product is obtained from benzene having a melting point of between 192.5° C.–193.5° C.

Substituting phenylacetonitrile for the propionitrile in Example 6, a similar yield of 4-amino-5-phenyl-2,6-dibenzylpyrimidine is obtained.

While the foregoing examples are directed to a batch process, the reaction advantageously lends itself readily to semi-continuous or continuous procedures. For instance, the nitrile reactant can be preheated in a first zone, then fed to a second zone of a suitably heated pressurized reaction vessel containing the iron carbonyl catalyst and, finally, continuously removing the desired 4-aminopyrimidine product.

I claim:

1. A process for the preparation of 4-aminopyrimidines which comprises the steps of: heating a nitrile of the formula:

$$R—CH_2CN$$

wherein R is a radical selected from the group consisting of (lower)alkyl, phenyl, nitro-phenyl, (lower)alkyl-phenyl, nitro-phenyl-(lower)alkyl, lower alkyl-phenyl-(lower)alkyl, and phenyl-(lower alkyl) with an iron carbonyl catalyst in the presence of 0–10 mols of an acetylene diluent per mol of iron carbonyl catalyst, at a temperature of at least 150° C. but below the decomposition point of the said nitrile under at least its autogenous pressure but below about 500 p.s.i.g., and thereafter recovering the corresponding 4-aminopyrimidine.

2. The process according to claim 1, wherein the nitrile is acetonitrile.

3. The process according to claim 1, wherein the nitrile is propionitrile.

4. The process according to claim 1, wherein the nitrile is phenylacetonitrile.

5. The process according to claim 1, wherein the nitrile is o-nitrophenylacetonitrile.

6. The process according to claim 1, wherein the nitrile is p-nitrophenylbutyronitrile.

7. The process according to claim 1, in which the catalyst is present in amounts equal to from 0.1% to 10% based on the weight of the nitrile.

8. The process according to claim 7, in which the catalyst is prepared by admixing approximately equimolar quantities of iron pentacarbonyl with hexyne-3.

9. The process according to claim 7, in which the catalyst is prepared by admixing approximately equimolar quantities of iron pentacarbonyl and pentyne-1.

10. The process according to claim 7, in which the catalyst is iron tetracarbonyl.

11. The process according to claim 7, in which the catalyst is diferrocarbonyl.

12. The process according to claim 7, in which the catalyst is iron pentacarbonyl.

References Cited in the file of this patent

UNITED STATES PATENTS

| 2,503,999 | Cairns et al. | Apr. 11, 1950 |
| 2,525,714 | Norton | Oct. 10, 1950 |

FOREIGN PATENTS

| 812,250 | Germany | Aug. 27, 1951 |